US008965872B2

(12) United States Patent  (10) Patent No.: US 8,965,872 B2
Hsu et al.  (45) Date of Patent: *Feb. 24, 2015

(54) IDENTIFYING QUERY FORMULATION SUGGESTIONS FOR LOW-MATCH QUERIES

(75) Inventors: Bo-June Hsu, Woodinville, WA (US); Kuansan Wang, Bellevue, WA (US); Yu-Ting Kuo, Sammamish, WA (US); Chao-Chia Liu, Sammamish, WA (US); Heung-Yeung Shum, Medina, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/172,561

(22) Filed: Jun. 29, 2011

(65) Prior Publication Data

US 2012/0265787 A1 Oct. 18, 2012

Related U.S. Application Data

(60) Provisional application No. 61/476,154, filed on Apr. 15, 2011.

(51) Int. Cl.
*G06F 7/00* (2006.01)
*G06F 17/00* (2006.01)
*G06F 17/30* (2006.01)

(52) U.S. Cl.
CPC ...... *G06F 17/3064* (2013.01); *G06F 17/30654* (2013.01); *G06F 17/30731* (2013.01)
USPC ............ 707/706; 707/708; 707/728; 707/765

(58) Field of Classification Search
CPC .................. G06F 17/30663; G06F 17/30687
USPC ................... 704/4; 705/3; 386/252; 707/711
See application file for complete search history.

(56) References Cited

U.S. PATENT DOCUMENTS

| 6,418,431 | B1 * | 7/2002 | Mahajan et al. ...................... 1/1 |
| 6,460,029 | B1 | 10/2002 | Fries et al. |
| 6,647,383 | B1 | 11/2003 | August et al. |
| 7,013,264 | B2 | 3/2006 | Dolan et al. |
| 7,092,936 | B1 | 8/2006 | Alonso et al. |
| 7,103,264 | B2 * | 9/2006 | Kobayashi ................... 386/252 |
| 7,197,494 | B2 | 3/2007 | Wang et al. |

(Continued)

OTHER PUBLICATIONS

Li, et al., "XQSuggest: An Interactive XML Keyword Search System", In proceedings of the 20th International Conference on Database and Expert Systems Applications, Aug. 31-Sep. 4, 2009, 8 pages.

(Continued)

*Primary Examiner* — Susan Chen
(74) *Attorney, Agent, or Firm* — Dave Ream; Doug Barker; Micky Minhas

(57) ABSTRACT

Systems, methods and computer-storage media are provided for identifying low-match search queries and determining comparable item matches to suggest to the user in response to a low-match query. "Low-match queries" are queries for which an insufficient number of exact item matches are available. In embodiments, exact and/or comparable item matches may be determined via semantic analysis. Also provided are systems, methods and computer-storage media for informing the user, by way of a presented indicator, or the like, that a presented item was selected for presentation based upon a similarity metric rather than being determined an exact match for the input query.

19 Claims, 4 Drawing Sheets

(56) References Cited

U.S. PATENT DOCUMENTS

| | | |
|---|---|---|
| 7,200,559 B2 | 4/2007 | Wang |
| 7,240,049 B2 | 7/2007 | Kapur |
| 7,328,211 B2 | 2/2008 | Bordner et al. |
| 7,430,505 B1 | 9/2008 | Horvitz et al. |
| 7,461,059 B2 | 12/2008 | Richardson et al. |
| 7,502,730 B2 | 3/2009 | Wang |
| 7,519,529 B1 | 4/2009 | Horvitz |
| 7,624,075 B2 | 11/2009 | Lucco et al. |
| 7,676,460 B2 | 3/2010 | Morgan |
| 7,680,778 B2 | 3/2010 | Middha et al. |
| 7,725,485 B1 | 5/2010 | Sahami et al. |
| 7,756,855 B2 | 7/2010 | Ismalon |
| 7,765,178 B1 | 7/2010 | Roizen et al. |
| 7,774,193 B2* | 8/2010 | Gao et al. .......... 704/4 |
| 7,809,568 B2 | 10/2010 | Acero et al. |
| 7,818,279 B2 | 10/2010 | Liu et al. |
| 7,870,117 B1 | 1/2011 | Rennison |
| 7,912,705 B2 | 3/2011 | Wasson et al. |
| 8,019,748 B1 | 9/2011 | Wu et al. |
| 8,140,556 B2 | 3/2012 | Rao et al. |
| 8,224,829 B2 | 7/2012 | Pauly |
| 8,244,726 B1 | 8/2012 | Matesso et al. |
| 8,265,797 B2 | 9/2012 | Nickerson et al. |
| 8,335,778 B2 | 12/2012 | Ghosh et al. |
| 8,412,525 B2* | 4/2013 | Mukerjee et al. .......... 704/254 |
| 8,489,445 B1 | 7/2013 | Berg et al. |
| 2002/0029232 A1 | 3/2002 | Bobrow et al. |
| 2002/0143860 A1 | 10/2002 | Catan |
| 2003/0115192 A1 | 6/2003 | Kil et al. |
| 2003/0220917 A1 | 11/2003 | Copperman et al. |
| 2004/0225643 A1 | 11/2004 | Alpha et al. |
| 2004/0243555 A1 | 12/2004 | Bolsius et al. |
| 2004/0249808 A1 | 12/2004 | Azzam et al. |
| 2005/0071328 A1 | 3/2005 | Lawrence |
| 2005/0108001 A1 | 5/2005 | Aarskog |
| 2005/0137849 A1 | 6/2005 | Parkinson |
| 2005/0234881 A1 | 10/2005 | Burago et al. |
| 2005/0234953 A1* | 10/2005 | Zhang et al. .......... 707/101 |
| 2006/0111896 A1 | 5/2006 | Menezes et al. |
| 2006/0117003 A1 | 6/2006 | Ortega et al. |
| 2006/0167842 A1 | 7/2006 | Watson |
| 2006/0206454 A1 | 9/2006 | Forstall et al. |
| 2007/0050352 A1 | 3/2007 | Kim |
| 2007/0061335 A1 | 3/2007 | Ramer et al. |
| 2007/0100653 A1 | 5/2007 | Ramer et al. |
| 2007/0106509 A1 | 5/2007 | Acero et al. |
| 2007/0192143 A1* | 8/2007 | Krishnan et al. .......... 705/3 |
| 2007/0192318 A1 | 8/2007 | Ramer et al. |
| 2007/0219966 A1 | 9/2007 | Baylis et al. |
| 2008/0114760 A1* | 5/2008 | Indeck et al. .......... 707/6 |
| 2008/0140696 A1 | 6/2008 | Mathuria |
| 2008/0208567 A1 | 8/2008 | Brockett et al. |
| 2008/0215557 A1 | 9/2008 | Ramer et al. |
| 2008/0256061 A1 | 10/2008 | Chang et al. |
| 2009/0006384 A1 | 1/2009 | Tunkelang et al. |
| 2009/0006385 A1 | 1/2009 | Tunkelang et al. |
| 2009/0006386 A1 | 1/2009 | Tunkelang et al. |
| 2009/0006387 A1 | 1/2009 | Tunkelang et al. |
| 2009/0012778 A1 | 1/2009 | Feng et al. |
| 2009/0077047 A1 | 3/2009 | Cooper et al. |
| 2009/0082037 A1 | 3/2009 | Ju et al. |
| 2009/0083232 A1 | 3/2009 | Ives et al. |
| 2009/0089044 A1 | 4/2009 | Cooper et al. |
| 2009/0094145 A1 | 4/2009 | Kim et al. |
| 2009/0106224 A1 | 4/2009 | Roulland et al. |
| 2009/0119289 A1 | 5/2009 | Gibbs et al. |
| 2009/0132500 A1* | 5/2009 | Jones et al. .......... 707/3 |
| 2009/0144262 A1* | 6/2009 | White et al. .......... 707/5 |
| 2009/0164895 A1 | 6/2009 | Baeza-Yates et al. |
| 2009/0171929 A1 | 7/2009 | Jing et al. |
| 2009/0192966 A1 | 7/2009 | Horvitz et al. |
| 2009/0254971 A1 | 10/2009 | Herz et al. |
| 2009/0271177 A1 | 10/2009 | Menezes et al. |
| 2009/0276419 A1 | 11/2009 | Jones et al. |
| 2009/0287690 A1 | 11/2009 | Bennett |
| 2009/0313237 A1 | 12/2009 | Agrawal et al. |
| 2009/0327270 A1 | 12/2009 | Teevan et al. |
| 2010/0005087 A1 | 1/2010 | Basco et al. |
| 2010/0010977 A1 | 1/2010 | Choi et al. |
| 2010/0082658 A1 | 4/2010 | Athsani et al. |
| 2010/0121839 A1 | 5/2010 | Meyer et al. |
| 2010/0131902 A1 | 5/2010 | Teran et al. |
| 2010/0185643 A1 | 7/2010 | Rao et al. |
| 2010/0191740 A1 | 7/2010 | Lu et al. |
| 2010/0205180 A1 | 8/2010 | Cooper et al. |
| 2010/0205202 A1 | 8/2010 | Yang et al. |
| 2010/0223275 A1 | 9/2010 | Foulger et al. |
| 2010/0257193 A1 | 10/2010 | Krupka et al. |
| 2010/0268702 A1 | 10/2010 | Wissner et al. |
| 2010/0332493 A1 | 12/2010 | Haas et al. |
| 2011/0035397 A1 | 2/2011 | Joshi et al. |
| 2011/0035403 A1 | 2/2011 | Ismalon |
| 2011/0071827 A1 | 3/2011 | Lee et al. |
| 2011/0078243 A1 | 3/2011 | Carpenter et al. |
| 2011/0083167 A1 | 4/2011 | Carpenter et al. |
| 2011/0093452 A1 | 4/2011 | Jain |
| 2011/0184945 A1 | 7/2011 | Das et al. |
| 2011/0202520 A1 | 8/2011 | Teran et al. |
| 2011/0231428 A1 | 9/2011 | Kuramura |
| 2011/0276432 A1 | 11/2011 | Bolivar et al. |
| 2012/0166426 A1 | 6/2012 | Milward et al. |
| 2012/0173174 A1 | 7/2012 | Gaarder |
| 2012/0265779 A1 | 10/2012 | Hsu et al. |
| 2012/0265784 A1 | 10/2012 | Hsu et al. |
| 2012/0265787 A1 | 10/2012 | Hsu et al. |
| 2012/0323905 A1 | 12/2012 | Qiao |
| 2013/0041921 A1 | 2/2013 | Cooper et al. |
| 2013/0173614 A1 | 7/2013 | Ismalon |
| 2013/0290342 A1 | 10/2013 | Cooper et al. |
| 2014/0012868 A1 | 1/2014 | Nakazaki |

OTHER PUBLICATIONS

Notification of Transmittal of the International Search Report and the Written Opinion of the International Searching Authority, or the Declaration in PCT/US2012/033718, mailed Sep. 27, 2012, 9 pages.

Non-Final Office Action in U.S. Appl. No. 13/166,969 mailed Jun. 6, 2012, 108 pages.

Non-Final Office Action in U.S. Appl. No. 13/167,007 mailed Oct. 11, 2012, 140 pages.

Non-Final Office Action in U.S. Appl. No. 13/166,969 mailed Apr. 29, 2013, 44 pages.

Strohmaier, "Intentional Query Suggestion: Making User Goals More Explicit During Search", Feb. 9, 2009, In proceedings of the 2009 workshop on Web Search Click Data, 7 pages.

Belkin, "Iterative Exploration, Design and Evaluation of Support for Query Reformulation in Interactive Information Retrieval", In Journal of Information Processing and Management: an International Journal—Special issue on interactivity at the text retrieval conference, vol. 37 Issue 3, May 2001, 32 pages.

Ma, "Learning Latent Semantic Relations from Clickthrough Data for Query Suggestion", In proceeding of the 17th ACM conference on Information and knowledge management, Oct. 26-30, 2008, 10 pages.

Baer, "A Semantics Based Interactive Query Formulation Technique", In proceedings of user Interfaces to Data Intensive Systems, 2001. UIDIS 2001. Proceedings. Second International Workshop on, May 31, 2001, 7 pages.

Hollink, "The Semantics of Query Modification", In Proceeding RIAO '10 Adaptivity, Personalization and Fusion of Heterogeneous Information, Apr. 30, 2010, 6 pages.

Dongilli, "Semantics Driven Support for Query Formulation", 2004, Available at: http://citeseerx.ist.psu.edu/viewdoc/download?doi=10.1.1.144.7182&rep=rep1&type=pdf#page=128.

Reynolds, "A Query Refinement Model for Exploratory Semantic Search", In Technical Report HPL-2009-167, HP Laboratories, Jul. 21, 2009, 17 pages.

Huang, et. al, "Contextual Knowledge Representation, Retrieval and Interpretation in Multimedia e-Learning", In Information Reuse and Integration, Oct. 27-29, 2003, 8 pages.

(56) References Cited

OTHER PUBLICATIONS

Notification of Transmittal of the International Search Report and the Written Opinion of the International Searching Authority, or the Declaration in PCT/US2012/033717, mailed Sep. 21, 2012, 9 pages.
Final Office Action in U.S. Appl. No. 13/166,696 mailed Dec. 24, 2013.
Notice of Allowance and Fee(s) Due in U.S. Appl. No. 13/166,969 mailed Oct. 23, 2012, 91 pages, Apr. 9, 2014.
Vera Hollink, Theodora Tsikrika and Arjen de Vries—"The Semantis of Queary Modification"—Proceeding RIAO '10 Adaptivity, Personalization and Fusion of Heterogeneous Information—ACM—2010—Le Centre De Hautes Etudes Internationales D'Informatique Documentaire Paris, France, pp. 176-181.
Edgar Meij, MarcBron, Laura Hollink, Bouke Huurnink, and Maarten de Rijke—"Learning Semantic Query Suggestions"—Semantic Web—ESWC 2009—Lecture Notes in Computer Science, 2009, vol. 5823/2009—pp. 424-440.
Final Office Action in U.S. Appl. No. 13/167,007 mailed Oct. 23, 2013, 54 pages.
Non-Final Office Action in U.S. Appl. No. 13/166,969 electronically notified on Apr. 9, 2014, 47 pages.
Notice of Allowance dated Sep. 18, 2014 in U.S. Appl. No. 13/166,969, 12 pages.
Gábor Nagypál—"Improving Information Retrieval Effectiveness by Using Domain Knowledge Stored in Ontologies"—on the Move to Meaningful Internet Systems 2005: OTM 2005 Workshops Lecture Notes in Computer ScienceVolume 3762, 2005, pp. 780-789.
Epaminondas Kapetanios, Vijayan Sugumaran, and Diana Tanase—"Multi-lingual Web Querying: A Parametric Linguistics Based Approach"—Natural Language Processing and Information Systems Lecture Notes in Computer ScienceVolume 3999, Jun. 2, 2006, pp. 94-105.

\* cited by examiner

IDENTIFYING QUERY FORMULATION SUGGESTIONS FOR LOW-MATCH QUERIES

CROSS-REFERENCE TO RELATED APPLICATIONS

This application claims the benefit of Provisional Patent Application No. 61/476,154 filed on Apr. 15, 2011 and entitled "Semantic Query Suggestion for Content Search. This application is further related by subject matter to U.S. patent application Ser. No. 13/166,969 entitled "Interactive Semantic Query Suggestion for Content Search," filed on Jun. 23, 2011 and U.S. patent application Ser. No. 13/167,007 entitled "Ordering Semantic Query Formulation Suggestions," filed on Jun. 23, 2011. Provisional Patent Application No. 61/476,154 and U.S. patent application Ser. Nos. 13/166,969 and 13/167,007 are hereby incorporated by reference as set forth in their entirety herein.

BACKGROUND

Search query formulation and suggestion is a significant challenge for content searchers (e.g., Internet searchers) today. Typically, search engines provide an empty search box into which a user may input a search query (via text, touch, speech, multimedia, or the like) and interact with the search system. For various reasons, search queries provided by users do not always accurately reflect the user's actual intent. While some search engines are capable of assisting users in completing search queries, in many cases, the suggestions provided to the user may not reflect what the user is actually intending to search for as they are based solely on prior queries input by a collective group of users, and do not include unseen queries or queries that are seldom entered, but that may be what the user is intending to search for. Additionally, user-input queries may include ineffectual information or character sequences that do not generate any documents/ search results utilizing typical search algorithms. Likewise, users have little, if any, knowledge about what information the search system may have available with regard to achieving or answering the task they have in mind. As such, the search system may not return satisfactory results to the user due, at least in part, to the system's failure to understand or disambiguate the user's actual intent and to match that intent with useful information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to identifying low-match search queries and to determining items (e.g., categories, attributes, attribute values, entities) to suggest (for instance, as query formulation suggestions, related query suggestions, search results, and the like) to the user in response to a low-match query. "Low-match queries" are queries for which an insufficient number of exact item matches are available. For instance, if a user enters the query "Sony Laptop 19.5 inch screen," an exact item match would be a laptop computer manufactured by Sony and having a 19.5 inch screen. Suppose, however, that Sony makes a laptop with a 19.0 inch screen and a laptop with a 19.8 inch screen but does not make a laptop with a 19.5 inch screen. In accordance with embodiments of the present invention, in this instance, the entities "Sony Laptop 19.0 inch screen" and "Sony Laptop 19.8 inch screen" may be presented to the user (e.g., as query formulation suggestions, suggested related queries, search results, or the like) as they are comparable item matches to the input query and an insufficient number of exact item matches (in this instance, zero) is available.

Embodiments further relate to informing the user, by way of a presented indicator, or the like, that a presented item was selected for presentation based upon a similarity metric rather than being determined an exact match for the input query. In this regard, and utilizing the above example, the entities "Sony Laptop 19.0 inch screen" and "Sony Laptop 19.8 inch screen" may be presented with distinguishable font, highlighting, or the like, or may be presented with a character indicator such as "~" proximate thereto.

BRIEF DESCRIPTION OF THE DRAWINGS

The present invention is described in detail below with reference to the attached drawing figures, wherein.

DETAILED DESCRIPTION

Figure 1:
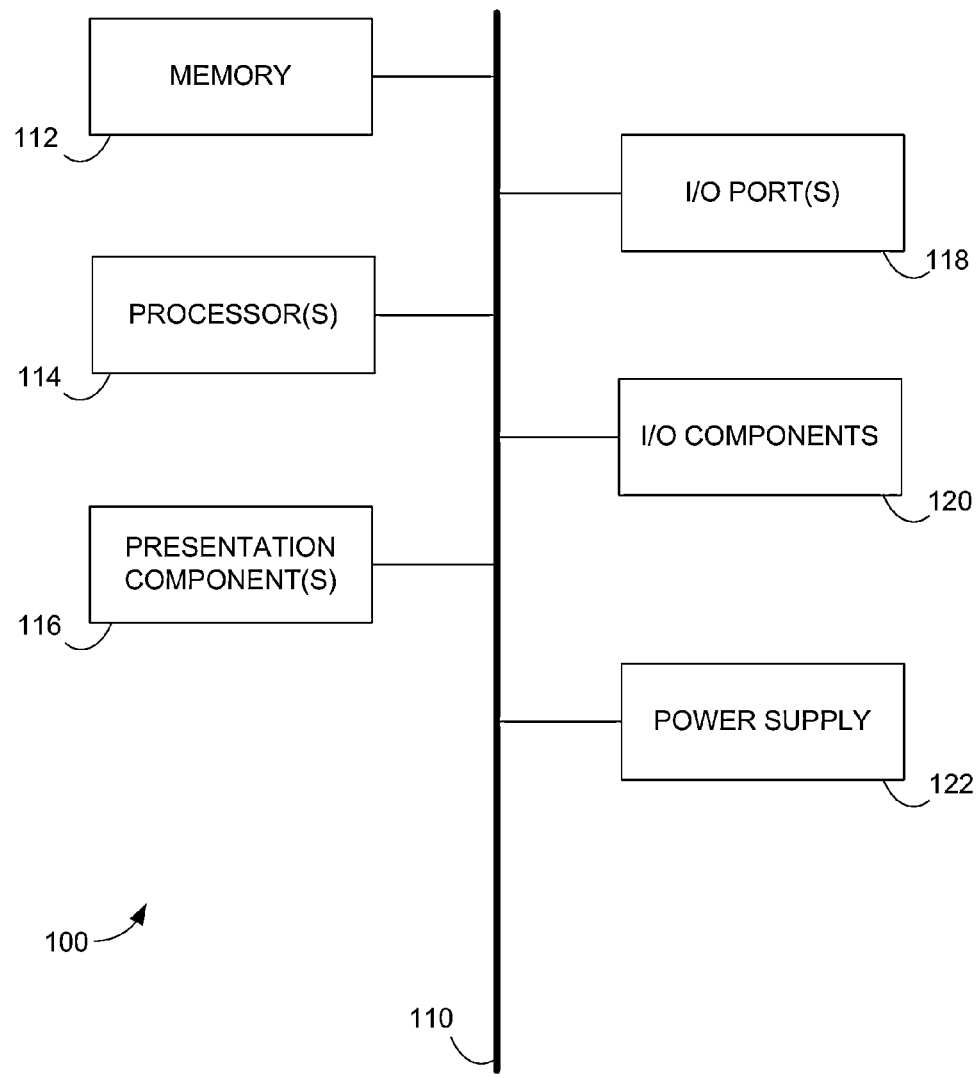
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to identifying low-match search queries and to determining items (e.g., categories, attributes, attribute values, entities) to suggest (for instance, as query formulation suggestions, related query suggestions, search results, and the like) to the user in response to a low-match query. "Low-match queries" are queries for which an insufficient number of exact item matches are available. For instance, if a user enters the query "Sony Laptop 19.5 inch screen," an exact item match would be a laptop computer manufactured by Sony and having a 19.5 inch screen. Suppose, however, that Sony makes a laptop with a 19.0 inch screen and a laptop with a 19.8 inch screen but does not make a laptop with a 19.5 inch screen. In accordance with embodiments of the present invention, in this instance, the entities "Sony Laptop 19.0 inch screen" and "Sony Laptop 19.8 inch screen" may be presented to the user (e.g., as query formulation suggestions, suggested related queries, search results, or the like) as they are comparable item matches to the input query and an insufficient number of exact item matches (in this instance, zero) are available. In embodiments, exact and/or comparable item matches may be determined via semantic analysis. Embodiments further relate to informing the user, by way of a presented indicator, or the like, that a presented item was selected for presentation based upon a similarity metric rather than being determined an exact match for the input query. In this regard, and utilizing the above example, the entities "Sony Laptop 19.0 inch screen" and "Sony Laptop 19.8 inch screen" may be presented with distinguishable font, highlighting, or the like, or may be presented with a character indicator such as "~" proximate thereto.

Accordingly, in one embodiment, the present invention is directed to a method performed by a computing device having a processor and a memory for identifying comparable item matches for search queries. The method includes receiving at least a portion of a search query, identifying any exact item matches for the at least a portion of the search query, determining whether a sufficient quantity of exact item matches are identified and, upon determining that an insufficient quantity of exact item matches is identified, identifying comparable item matches for the at least a portion of the search query.

In another embodiment, the invention is directed to one or more computer-storage media storing computer-useable instructions that, when used by a computing device, cause the computing device to perform a method for identifying query formulation suggestions. The method includes receiving at least a portion of a search query, identifying any exact item matches for the at least a portion of the search query, identifying comparable item matches for the at least a portion of the search query, utilizing at least a portion of the exact item matches and at least a portion of the comparable item matches to generate query formulation suggestions and transmitting at least a portion of the generated query formulation suggestions for presentation.

A further embodiment of the invention is directed to one or more computer-storage media storing computer-useable instructions that, when used by a computing device, cause the computing device to perform a method for identifying query formulation suggestions. The method includes receiving at least a portion of a search query, identifying any exact entity matches for the at least a portion of the search query, determining that an insufficient quantity of exact entity matches are identified, and identifying comparable entity matches for the at least a portion of the search query. Entity matches are identified as comparable if they have one or more of semantic similarity, numeric similarity, spelling similarity, geographic similarity, temporal similarity, and social similarity with respect to the at least the portion of the search query. Still further, the method includes utilizing at least a portion of the exact entity matches and at least a portion of the comparable entity matches to generate query formulation suggestions, and transmitting at least a portion of the generated query formulation suggestions for presentation.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. Embodiments of the invention may be practiced in a variety of system configurations, including handheld devices, consumer electronics, general-purpose computers, more specialty computing devices, and the like. Embodiments of the invention may also be practiced in distributed computing environments where tasks are performed by remote-processing devices that are linked through a communications network.

With reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

The computing device 100 typically includes a variety of computer-readable media. Computer-readable media may be any available media that can be accessed by the computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including I/O components 120, some of which may be built in. Illustrative components include a microphone, joystick, game pad, satellite dish, scanner, printer, wireless device, and the like.

Figure 2:
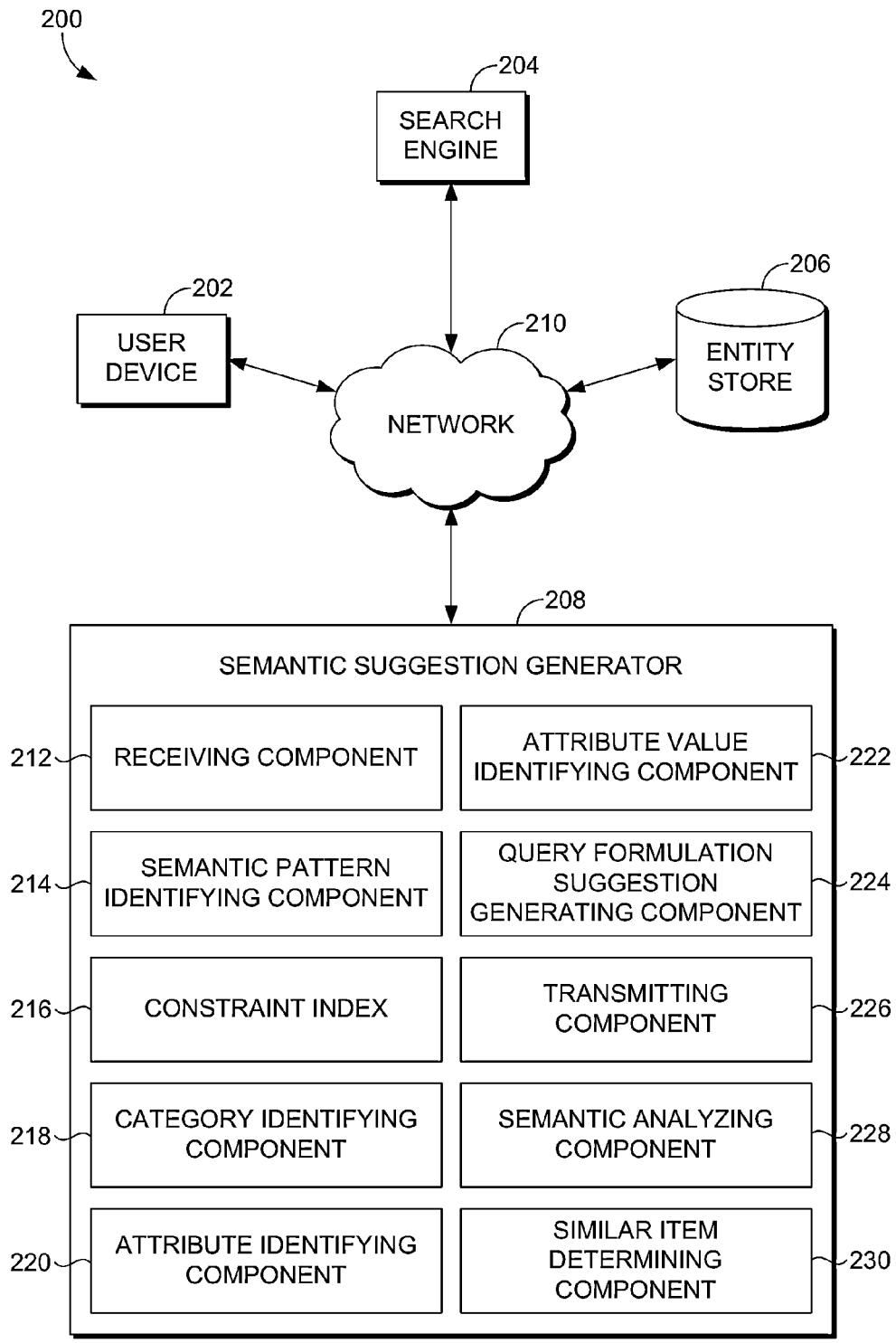
FIG. 2 is a block diagram of an exemplary system in which embodiments of the invention may be employed.

Referring now to FIG. 2, a block diagram is provided illustrating an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein. Among other components not shown, the system 200 includes a user device 202, a search engine 204, an entity store 206 and a semantic suggestion generator 208, all in communication with one another through a network 210. The network 210 may include, without limitation, one or more local area networks (LANs) and/or wide area networks (WANs). Such networking environments are commonplace in offices, enterprise-wide computer networks, intranets and the Internet. Accordingly, the network 210 is not further described herein.

In some embodiments, one or more of the illustrated components/modules may be implemented as stand-alone applications. In other embodiments, one or more of the illustrated components/modules may be integrated directly into other components. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, search engine computing devices, or the like. By way of example only, the semantic suggestion generator 208 might reside within the search engine 204, on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The entity store 206 is configured to store various types of information used by the semantic suggestion generator 208 and/or the search engine 204 to identify query formulation suggestions, related query suggestions, and/or query results. In embodiments, such identification is based on a semantic analysis of at least the portion of the search query entered by the user. The type of information stored in the entity store 206 may include, for example, entities, categories, attributes, and attribute values, weights or scores associated with entities/categories/attributes/attribute values, and the like, as more fully described below. More specifically, in various embodiments, the information stored in the entity store 206 may include, without limitation, entities (e.g., products available for commerce, locations, people, companies, organizations, and the like), categories to which such entities may correspond, attributes associated with the entities, attribute values associated with the entities as they pertain to particular attributes thereof. The information in the entity store 206 may also include common queries that previously have been issued or submitted to the search engine 204, in addition to popular or frequently selected interpretations. In embodiments, at least a portion of these common queries may be stored in a query log such that the query log may be accessed to identify common queries. Information stored in the entity store 206 may also include weights or scores associated with pairs of entities/categories/attributes/attribute values, and the like, the weights or scores indicating relative degrees of similarity, as more fully described below. It will be understood and appreciated by those of ordinary skill in the art that weighting and/or scoring is merely one methodology for indicating relative degrees of similarity and such is not intended to limit embodiments hereof.

The information stored in the entity store 206 may be used to generate query formulation suggestions, related query suggestions, and/or query results. "Query formulation suggestions," as used herein, refer to information (e.g., entities, categories, attributes, attribute values, and the like) that can be used to ascertain a user's true intent upon inputting a search query, or portion thereof. "Related query suggestions," as used herein, refer to information (e.g., entities, categories, attributes, attribute values, and the like) that is designed to assist the user in finding ways in which a search query may be entered, that differ from the currently input query or partial query, such that different search results, that may more closely approximate the information the user was intending to ascertain, may be presented. "Query results" or "search results," as used herein, refer to documents and/or links to documents that are determined to satisfy (or at least substantially satisfy) an input search query, or portion thereof. Often, presented search results are approximations of satisfying results rather than exact result matches, such as when an insufficient number of satisfying search results is available, as more fully described below.

In embodiments, a user's intent may be ascertained by the use of query formulation suggestions designed to assist the user in formulating a query, for instance, by expanding upon or clarifying a partial query that has been entered by the user. As such, in embodiments, query formulation suggestions are presented prior to the determination and/or presentation of any search results determined to satisfy the query (or partial query). Further, in embodiments, search results may be determined and presented only when an input search query, or portion thereof, reaches a semantic boundary. As such, if a partial search query is entered, query formulation suggestions and/or related query suggestions may be presented before search results are even identified. However, once the input query is modified to the point that a semantic boundary is reached, search results may be determined and presented, instead of or in addition to query formulation suggestions and/or related query suggestions. In embodiments, query formulation suggestions and/or related query suggestions may be updated based on the modified search query such that those presented prior to the presentation of search results and those presented after the presentation of search results may not be identical. Thus, those of skill in the art will understand that query formulation suggestions and related query suggestions differ from search results not only in content (although in some instances the content may be substantially similar), but also in their use upon user selection thereof. Selection and use of query formulation suggestions and related query suggestions is more fully described below.

Query formulation suggestions and related query suggestions may include various types of suggestions for formulating queries including, by way of example and not limitation, query-log-based query suggestions, semantic-pattern-based query suggestions (e.g., template-based query suggestions), categories associated with a search query, attributes associated with one or more identified entities, and attribute values associated with one or more identified entities. It should be noted that query formulation suggestions and related query suggestions may be identified, presented, and selected contemporaneously with query formulation, rather than post-query submission.

"Query-log-based query suggestions" are suggestions that attempt to aid the user in formulation of a search query designed to elicit search results that provide the user with the information s/he desires by providing the user with the most popular previously-submitted search queries identified from a query log that correspond to the character sequence entered into the search box at a particular instance. "Semantic-pattern-based query suggestions," on the other hand, refer to query formulation suggestions that are generated from semantic query patterns (e.g., templates). When a search query, or portion thereof, is submitted to the search system, a database of semantic query patterns (such as "<brand> camera," as more fully described below) is accessed and an attempt is made to identify one or more semantic query patterns that correspond in some way to the input search query or portion thereof. In generating semantic-pattern-based query suggestions, a database or entity store 206 may be used. By accessing entities and their respective associated information from the entity store 206, it can be ensured that only those semantic-pattern-based query suggestions that correspond with known entities are returned. As such, before being presented to a user, semantic-pattern-based query suggestions are compared to entities stored in the entity store 206. In one embodiment, if a particular semantic-pattern-based query suggestion does not correspond with any known entities in the entity store 206, the particular semantic-pattern-based query suggestion is not returned to the user. But if the particular semantic-pattern-based query suggestion does correspond with a known entity in the entity store 206, it may be returned to the user, as further discussed below. Semantic-pattern-based query suggestions may be presented to the user in much the same way as query-log-based query suggestions—as query formulation suggestions, related query suggestions, as search results, or any combination thereof.

"Entities," as used herein, are items having known information (e.g., categories, attributes, attribute values) associated therewith, the known information being organized (generally in a hierarchical fashion) and stored in the entity store 206. "Categories," "attributes" and "attribute values," as these terms are utilized herein, represent various hierarchical characteristics associated with entities and are useful in filtering or formulating search queries for providing a user with as accurate an answer to a particular query as possible. While an entity is often referred to herein in terms of a particular product, in embodiments, entities may also include other items that are not considered "products." For instance, for exemplary purposes only, entities also may include businesses, organizations, persons, or the like. Further, an entity may be a specific location that has associated categories, attributes, and/or attribute values from which the user may select to formulate the search query. The definition of an entity, as used herein, is not meant to be limiting, but may apply to many things that are potentially capable of having associated hierarchical characteristics. It should be noted that an entity itself may also be included in the definition of "hierarchical characteristics" as the lines between the various hierarchical levels are often drawn as design choices and are not meant to be limiting.

By way of example, suppose a user enters the character sequence "role" into a search query input area of a user interface. As a result, "rolex" may be identified as a potential query formulation suggestion and/or related query by either identifying it as a query-log-based query suggestion or as a semantic-pattern-based query suggestion. Here, "rolex" may be identified as a brand of watches, or may be a popular query, and may also correspond to one or more entities found in the entity index 206. The entity "rolex" may be associated with the category "watches," and such category may be returned to the user as a suggested category that may then be utilized to further formulate the user's search. Similarly, if a user enters the character sequence "facebo" into the search query input area, it may lead to the identification of the query formulation suggestion "facebook," which may correspond to one or more entities in the entity store 206. Further, the corresponding entity(ies) may include associated categories, such as "Web," such that an entered search query for "facebo" may return "Web" as a suggested query formulation. Presenting suggestions upon entry of partial queries provides the user with an indication as to how the portion of the entered search query has been interpreted thus providing an early indication of whether the query being input will provide desired information to the user.

In embodiments, a received search query may be identical or substantially similar to an identified category. For example, the search query "digital cameras" may result in a plurality of entities having an associated category of "digital cameras." While this would not in and of itself necessarily help in refining the user's search, armed with the knowledge that the category matches the intent of the user's search (given that it is an exact category match), various lower level hierarchical characteristics, e.g., attributes and attribute values, associated with the identified entity may be suggested to the user as possible query formulation suggestions and/or related query suggestions. As another example, suppose the user enters the character sequence "digital slr" as a portion of a search query into the search query input area. In accordance with embodiments of the present invention, the system may access the entity store 206 to determine one or more entities corresponding to the query "digital slr." Since there are several models of cameras that are SLR, there are likely several, if not hundreds, of entities that may be identified. The category in this instance may be "digital cameras."

In embodiments, the entity store 206 is configured to be searchable for one or more of the items stored in association therewith. It will be understood and appreciated by those of ordinary skill in the art that the information stored in association with the entity store 206 may be configurable and may include any information relevant to entities, categorizations of entities, characteristics of entities, weights and/or scores associated with entities, and the like. The content and volume of such information are not intended to limit the scope of embodiments of the present invention in any way. Further, though illustrated as a single, independent component, the entity store 206 may, in fact, be a plurality of storage devices, for instance, a database cluster, portions of which may reside on the semantic suggestion generator 208, another external computing device (not shown), and/or any combination thereof.

As previously stated, the entity store 206 is configured to store attributes for entities as they pertain to particular categories. Attributes are characteristics of the entities belonging to a particular category that may be suggested to a user to further describe or refine the user's intent upon entering a search query or portion thereof. For example, attributes for the entity "Canon PowerShot SX30" may be associated with the category "digital cameras." The entity "Canon PowerShot SX30," by way of example only, may be associated with the attributes "megapixels," "color," "zoom," "lens," "viewfinder type," "image stabilization," "brand," "type," "model," and the like. These attributes may be used to further refine a search query for "Canon PowerShot SX30" to aid in discovering the user's true intent.

In addition to entities and categories and attributes associated with entities, the entity store 206 also is configured to store attribute values as they pertain to particular entities and associated attributes. For instance, for the attribute "color" associated with the entity "Canon PowerShot SX30," attribute values may include, for instance, "black," "blue," "red," "silver," etc. Attribute values may be suggested to the user as query formulation suggestions to aid in further describing or refining the user's intent upon receiving a search query, or portion thereof. This effectively blends browsing and searching experiences of web scale databases. As mentioned, attributes and attribute values are dependent upon the particular entity with which they are associated, and also are dependent upon the current state of the search query. For instance, if the search query already has a color specified, the attribute "color," and/or any attribute values associated only with the attribute "color," may not even be presented to the user. Similarly, if the user has specified in the search query or has already selected an attribute value of "Canon," the system may not present the attribute of "brand" to the user, or any attribute values associated only with the attribute "brand."

While generally described in the context of search queries and assisting the user to define a search query, embodiments of the present invention may also be used in the context of related search, related categories, related concepts, and the like. For instance, in one embodiment, alternative categories may be displayed for the user in addition to the best category associated with the entities that correspond to the search query. These alternative categories may be configured to be selectable by the user if, for instance, the user is not satisfied with the category chosen by the system (e.g., it does not seem to correspond to the user's true intent). This functionality is further described below.

With continued reference to FIG. 2, each of the user device 202, the search engine 204 and the semantic suggestion generator 208 may be any type of computing device, such as computing device 100 described with reference to FIG. 1, for example. The components may communicate with each other via a network 210, which may include, without limitation, one or more local area networks (LANs) and/or wide area networks (WANs). Such networking environments are commonplace in offices, enterprise-wide computer networks, intranets, and the Internet. It should be understood that any number of user devices, segments, and hybrid-distribution system servers may be employed within the system 200 within the scope of embodiments of the present invention. Each may comprise a single device or multiple devices cooperating in a distributed environment. For instance, the search engine 204 may comprise multiple devices arranged in a distributed environment that collectively provide the functionality of the search engine 204 described herein. Additionally, other components (not shown) may also be included within the system 200, while components shown in FIG. 2 may be omitted in some embodiments.

The user device 202 may be any type of computing device owned and/or operated by an end user that can access the network 210. For instance, the user device 202 may be a desktop computer, a laptop computer, a tablet computer, a mobile device, or any other device having network access. Generally, an end user may employ the user device 202 to, among other things, access electronic documents by submitting a search query to the search engine 204. For instance, the end user may employ a web browser on the user device 202 to access and view electronic documents stored in the system 200. According to embodiments of the present invention, the user additionally may be able to interact with the user device 202 by selecting query formulation suggestions, related query suggestions, search results, and the like, and/or by selecting or defining degrees of similarity or precision for non-exact entity matches, as more fully described below.

The search engine 204 may comprise multiple components that are responsible for receiving an entered search query and identifying one or more documents that are relevant to that particular search query and/or that are determined to satisfy the particular query. In embodiments of the present invention, multiple sets of relevant documents/search result may be presented to the user over the course of time from when the user begins to input the character sequence that defines the search query, to when a satisfactory response is received by the user through additional input of character sequences, selection of search query formulation suggestions, selection of related search query suggestions, and the like. As such, the search engine 204 and the semantic suggestion generator 208, in one embodiment, are generally in substantially continuous communication with one in another while a particular search query is being formulated. In other embodiments, the search engine 204 and the semantic suggestion generator 208 may be in intermittent communication with each other. For instance, search results may be requested and updated only when a semantic boundary (e.g., completion of a term in the search query, addition of an attribute value to the search query, etc.) is reached in the search query. As is understood by those of ordinary skill in the art, the search engine 204 may utilize one or more search indexes that have indexed documents from the web so that the most relevant search results can be identified in an efficient manner. In addition to web documents, the search engine 204 may provide results from semi-structured databases based on the semantic constraints specified in the query. Any and all such variations, and any combination thereof, are contemplated to be within the scope of embodiments hereof.

As mentioned, in embodiments, search results are requested and updated when a semantic boundary in the search query is reached, such as when a term comprising the search query has been completed. This may occur when a new term has been added to the search query by either user input of a character sequence, by a user selection of a query formulation suggestion, or by a user selection of a related query suggestion, which causes the search query to be modified according to the user input, selected query formulation suggestion or related query suggestion, respectively.

As shown in FIG. 2, the semantic suggestion generator 208 includes a receiving component 212, a semantic pattern identifying component 214, a constraint index 216, a category identifying component 218, an attribute identifying component 220, an attribute value identifying component 222, a query formulation suggestion generating component 224, a transmitting component 226, a semantic analyzing component 228, and a comparable entity determining component 230. In some embodiments, one or more of the components 212, 214, 216, 218, 220, 222, 224, 226, 228, and 230 may be implemented as stand-alone applications. In other embodiments, one or more of the components 212, 214, 216, 218, 220, 222, 224, 226, 228, and 230 may be integrated directly into the operating system of a computing device such as the computing device 100 of FIG. 1. It will be understood by those of ordinary skill in the art that the components 212, 214, 216, 218, 220, 222, 224, 226, 228, and 230 illustrated in FIG. 2 are exemplary in nature and in number and should not be construed as limiting. Any number of components may be employed to achieve the desired functionality within the scope of embodiments hereof.

Additional components of the semantic suggestion generator 208 (not shown) may include, without limitation, a processing unit, internal system memory, and a suitable system bus for coupling various system components, including one or more data stores for storing information (e.g., files and metadata associated therewith). The semantic suggestion generator 208 typically includes, or has access to, a variety of computer-readable media. By way of example, and not limitation, computer-readable media may include computer-storage media and communication media. In general, communication media enables each computing device to exchange data via a network, e.g., network 210. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system environment 200 is merely exemplary. While the semantic suggestion generator 208 is illustrated as a single unit, one skilled in the art will appreciate that the semantic suggestion generator 208 is scalable. For example, the semantic suggestion generator 208 may in actuality include a plurality of computing devices in communication with one another. Moreover, the entity store 206, or portions thereof, may be included within, for instance, the semantic suggestion generator 208, a Website source, or a third-party service as a computer-storage medium. The single unit depictions are meant for clarity, not to limit the scope of embodiments in any form.

The receiving component 212 is configured to receive search queries, or portions thereof, input by users (e.g., users of user device 202). Such information may be received in real-time upon entry by a user. Search queries may also be received by the receiving component 212 from one or more query logs having historical query information included therein for one or both of a particular user and a group of users as a whole. Received search queries, or portions thereof, may be semantically analyzed, as further described herein, to identify one or more query formulation suggestions to present to the user as suggestions for formulating the current search query. Query formulation suggestions may be generated, in one instance, using templates associated with queries, attributes, categories, attribute values, etc. Thus, the receiving component 212 is additionally configured to receive information from the entity store 206. Information corresponding to exact entity matches as well as information (e.g., categories, attribute, attribute values, etc.) from the entity store 206 associated with non-exact or comparable entity matches may be useful in ascertaining the user's intent. An indication of how similar a non-exact entity match must be to provide useful information may be provided by way of a design default or may be specified by the user. Thus, in embodiments, the receiving component 212 is further configured to receive indications from the user selecting or defining degrees of similarity or precision for non-exact entity matches. Still further, the receiving component 212 is configured to receive indications of user selections of query formulation suggestions, related query suggestions, search results, and the like. Such indications may be received, by way of example only, from user device 202 (via network 210).

The semantic pattern identifying component 214 is configured to identify semantic patterns associated with queries, categories, attributes and attribute values. In embodiments, the semantic pattern identifying component 214 identifies terms or phrases (e.g., n-grams or sets of n words commonly used) commonly associated with categories corresponding to particular entities. As mentioned, semantic patterns are similar to templates, in that at least a portion of a semantic query pattern identifies a particular category or attribute that is filled in based on the received search query. Templates may be stored in a semantic grammar index, for instance, as shown herein at reference numeral 3214 in FIG. 32 (more fully described below).

In embodiments, semantic query patterns may be identified algorithmically from information stored in query logs and/or the entity store 206. Semantic query patterns, that is, linguistic patterns contained in received queries, will vary among languages and are determined based upon knowledge of how particular entities are commonly phrased in the language in which a search query is received. Alternatively or additionally, for instance in situations where standard language-specific linguistic patterns are unable to be identified or are clearly not followed, semantic query patterns of interest may be identified manually via editorial intervention.

In embodiments, weights or probabilities (that is, the likelihood of a particular semantic query pattern being a pattern that represents the true intent of a user) also may be determined by the semantic pattern identifying component 214. In embodiments, such weights may be determined based upon one or both of availability and interest. In terms of availability, the semantic pattern identifying component 214 may examine the data contained in the entity store 206 and estimate how frequently particular items or entities are likely to occur. For instance, in a commerce setting, the semantic pattern identifying component 214 may examine the data on product availability that is contained in the entity store 206 and estimate how frequently each entity is likely to be offered or available. The more frequently a particular entity will be offered or available, the higher the probability or weight assigned to that entity will be.

In terms of interest, the semantic pattern identifying component 214 may examine input user queries and/or user-behavior with respect to the entities stored in association with the entity store 206, and generate a weight that represents relative user interest in a particular entity. For instance, in the commerce setting, the semantic pattern identifying component 214 may examine user queries and/or behavior with respect to a particular product and estimate the relative interest of users in that product. Products with higher user interest will then be assigned a higher probability or weight. In embodiments wherein both availability and interest are utilized to determine weights or probabilities of given entities/items, a single weight representing some combination of the availability weight and the user interest weight may be determined.

In embodiments, semantic attribute value patterns may be identified algorithmically from information stored in query logs and/or the entity store 206. Semantic attribute value patterns, that is, linguistic patterns contained in attribute values, will vary among languages and are determined based upon knowledge of how particular entities are commonly phrased in the language in which an attribute value is identified. Alternatively or additionally, for instance in situations where standard language-specific linguistic patterns are unable to be identified or clearly are not followed, semantic attribute value patterns of interest may be identified manually via editorial intervention.

The constraint index 216 is configured to extract entities from the entity store 206 with their respective categories, attributes, attribute values and corresponding weights and to determine unreasonable semantic patterns for each entity—that is, to determine semantic patterns that are illogical or are highly unlikely. Thus, if a particular category is rarely in the entity store 206 associated with an entity having a particular attribute, that category/attribute pair would be determined to be illogical for the particular entity. More commonly, constraints among attributes within a particular category may be applied such that, e.g., the term "Microsoft Playstation" is not suggested because the brand "Microsoft" and the product "Playstation" are incompatible. The constraint index 216 may be utilized to filter semantic patterns identified by the semantic pattern identifying component 214 to more quickly and efficiently arrive at suggestions that represent the true intent of the user. This functionality is more fully described below. In embodiments, the constraint index 216 is further configured to build a compressed binary representation of the extracted data.

In embodiments, the constraint index 216 is configured to build a compressed binary entity index that allows the semantic suggestion generator 208 to efficiently determine the top attributes and attribute values matching a given set of constraints in a particular category and an optional prefix, along with their weights. In this way, hypotheses that cannot be true can be quickly eliminated leading to increased efficiency in arriving at suggestions to aid in determining user intent. For instance, if the user is searching a directory that is organized alphabetically and the user inputs the character "a," the compressed binary entity index can quickly filter the directory and eliminate all items not beginning with the character "a."

The category identifying component 218 is configured to identify the top category associated with a query. In embodiments, the category identifying component 218 is further configured to identify one or more categories that are related to the query, but that may not have been initially selected as the category thought to be most relevant to the search query.

In embodiment, categories are stored in the entity store 206 in relation to their associated entities. In some embodiments, an entity may not have an associated category, and as such a category is not presented in association with the user interface. (Presentation of categories, attributes, attribute values, and the like, is more fully described below.)

Similarly, the attribute identifying component 220 is configured to identify at least one attribute associated with an entity. Attributes, as used herein, classify different characteristics associated with entities, and are specific to the entity to which they correspond. For instance, one entity may be associated with a particular attribute, but that attribute may not be associated with a different entity. In embodiments the attribute identifying component 220 is further configured to identify attributes that are related to entities, but that may have not been identified as one of the most relevant attributes.

The attribute value identifying component 222 is configured to identify attribute values associated with an attribute/entity pairs. Attribute values, as used herein, are values that correspond directly to the attribute and entity with which they are associated. For example, if a specific type of watch does not come in the color purple, "purple" is not presented to the user as an attribute value corresponding to the attribute "color." One entity may be associated with a particular attribute, but that attribute may not be associated with a different entity. In embodiments the attribute value identifying component 222 is further configured to identify one or more attribute values that are related to the entity but may not have been identified as one of the most relevant attributes.

The query formulation suggestion generating component 224, given a search query (or portion thereof), is configured to construct a lattice of possible interpretations of the input query (or query portion). The lattice is dynamically composed utilizing the semantic patterns identified by the semantic pattern identifying component 214 and applying a search algorithm (for instance, the A* search algorithm well known to those of ordinary skill in the art) to find the search query completion path or paths that represent the most likely intent of the user while preserving the constraints imposed by the constraint index 216. These types of algorithms can also find extensions of a partial inputted search query. Those completion paths (refined queries) identified as most likely intended by the user are those that are identified as having the highest overall weights, that is, the highest probabilities.

The transmitting component 226 is configured to transmit query formulation suggestions and related query suggestions, both of which may take the form of query-log-based query suggestions or semantic-pattern-based query suggestions, entities, categories, attributes, attribute values, or the like, for presentation. For instance, the query "digital ca" may result in a query-log-based query suggestion of "digital camera." Similarly, the query "canon in ca" may result in a category completion (e.g., query formulation suggestion and/or related query suggestion) of "canon in cameras." Further, the query "cameras by br" may result in the attribute completion (e.g., query formulation suggestion and/or related query suggestion) of "cameras by brand." The query "cameras by can" may result in an attribute value completion (e.g., query formulation suggestion and/or related query suggestion) of "cameras by canon."

The semantic analyzing component 228 is configured to semantically analyze a received search query, or a portion thereof, in order to identify the most relevant query formulation suggestions and/or related query suggestions based on the received search query. In embodiments, algorithms are used to semantically analyze search queries. In one embodiment, as previously described, semantic-pattern-based query suggestions are derived using semantic query patterns and the entity store 206. For instance, semantic-pattern-based query suggestions may be compared to known entities in the entity store 206 prior to being transmitted for presentation. For example, for the partial query "canon ca," the system 200 may search through query records, query/attribute templates, category terms and phrases (e.g., n-grams), etc. to find possible completions of the query that are also consistent with the known information in the entity store 206. Suppose that "<brand> camera" is in the "digital camera" category and "<brand> car stereos" is in the "car stereos" category as query templates. Possible semantic-pattern-based query suggestions may include, for exemplary purposes only, "canon camera" and "canon car stereos." However, when consulting with the entity store 206, it is determined that there is no such entity associated with the category "car stereos" with the brand "canon." This indicates that "canon car stereos" is an invalid query formulation suggestion, and thus is not provided as a suggestion.

In some instances, multiple query templates are stored for different categories that match the same query. For example, the partial query "can" may be completed to "canon" using the template "<brand>" in both the "digital camera" and "printers" category. In other words, there are entities in both categories with "canon" as the brand. In such scenarios, we show category disambiguation for the completion suggestion "canon," as further described herein. It is possible that there are other completions for "can" that are also ambiguous, such as "candy" as a type of food or the name of a movie. Thus, within a single suggestion list, there may be multiple completion suggestions that are category ambiguous.

Once potential query completion suggestions are identified, if a user selects a completion or if the system 200 has a high enough confidence for a particular completion, the system 200 may further identify query formulation suggestions for that particular entity about which the system has a high degree of confidence. For example, if the system 200 knows that "canon camer" completes to "canon camera" with a high probability, query formulation suggestions such as "canon camera by resolution," "canon camera by color," etc., may be presented to the user. Even if the user enters "canon camera," the system 200 may still first try to complete the query before suggestion query formulation suggestions.

The comparable item determining component 230 is configured to determine whether an input query is "low-match." Oftentimes, input search queries are determined to be "low-match" because few or no exact item matches are available (e.g., in the entity store 206) for presentation in response to the input query. For instance, suppose a user enters the query "Sony Laptop 19.5 inch screen." An exact item match for the query would be a laptop computer manufactured by Sony and having a 19.5 inch screen. Supposed further, however, that Sony makes a laptop with a 19.0 inch screen and a laptop with a 19.8 inch screen but does not make a laptop with a 19.5 inch screen. In this instance, the input query "Sony Laptop 19.5 inch screen" would be a low-match query as zero exact item matches are available for presentation.

In accordance with embodiments of the present invention, the comparable item determining component 230 is configured to ascertain whether comparable item matches will be presented to the user, generally (though not necessarily) in conjunction with one or more exact matches. In this regard, the comparable item determining component 230 is configured to initially attempt to preserve the user's original intent as much as possible. That is, the comparable item determining component will only search for comparable item matches if circumstances warrant such search.

In embodiments, queries may be determined to be "low-match" based simply upon a quantity of items deemed to be exact item matches. In such instances, queries for which there are no exact item matches as well as queries for which there is one or more exact item matches but, due to the specificity of the query, the number of exact item matches is very small, are determined to be low-match. In accordance with such embodiments, determining whether a sufficient number of exact item matches is available is generally based upon a predefined threshold value or the like. Such threshold value may be an absolute value (set by the system designer and/or the user) or may be a sliding scale value that is configurable by the system designer and/or the user. In other instances, low-match queries may be only those queries for which there are zero exact item matches available for presentation. Any and all such variations, and any combination thereof, are contemplated to be within the scope of embodiments hereof.

In embodiments, a user may be permitted to specifically request to be presented with comparable item matches, possibly in addition to exact item matches and possibly in lieu thereof. For instance, the user may input a word of approximation (e.g., "around," "about," "approximately," etc.) in conjunction with an input query or may input a character indicator such as "~" to specify that they would like comparable item matches to be presented.

The comparable item determining component 230 further is configured to, upon determining that a query is low-match or that a user desires to be presented with comparable item matches, identify comparable item matches for a search query. "Comparable item matches" are matches that, while not exactly matching an input query, are sufficiently similar to warrant consideration by the user as potentially matching items. Various methodologies may be utilized to determine whether an item is similar enough to be considered a comparable item match. By way of example, and not limitation, a score or weight may be assigned to each of a plurality of non-matching entities that indicates a relative similarity (among the plurality of non-matching entities) to an item that would be an exact match to the input query. The score or weight may then be compared to a similarity value or range that is predefined to be acceptable by the user (e.g., by the system designer or by the user him or herself).

It should be noted that similarity scores or weights are order-dependent. That is, how similar item A is to item B may not be the same as how similar item B is to item A. For instance, suppose a user enters the query "10 MP camera." In this instance, an item that is a "10.1 MP camera" likely is a good match and would be provided a favorable similarity score. However, had the user entered the query "10.1 MP camera," the item "10 MP camera" is likely not as good a match as the user appears to have something rather specific in mind. In this instance, a 10 MP camera is likely to be given a moderate similarity score. Generally speaking, the more precise an input search query is, the smaller the range or the lesser the quantity of items acceptable as "comparable". In embodiments hereof, users may be permitted to specify the acceptable similarity range, for instance, through an advanced user interface. By way of example only, this functionality could be enabled through the use of a slider, a touch screen, or the like.

It should also be noted that items determined to be comparable may have any one or more of semantic similarity, numeric similarity, spelling similarity, geographic similarity, temporal similarity, social similarity, and the like. Any and all such variations, and any combination thereof, are contemplated to be within the scope of embodiments of the present invention.

Oftentimes, an input query will specify multiple hierarchical characteristics, any number of which may be determined to be low-match. Accordingly, the comparable item determining component 230 will take into account similarity scores or weights for each comparable item and for each of the characteristics that are determined to be low-match. By way of example only, suppose a user enters the query "10 MP camera with 3 inch screen." Suppose further that both "10 MP" and "3 inch screen" are determined to be low-match as there are too few matches for either characteristic. Now suppose that "10.1 MP" is given a similarity score of 0.9, "9.9 MP" is also given a similarity score of 0.9, "3.1 inch screen" is given a similarity value of 0.9 and "2.8 inch screen" is given a similarity value of 0.8. In this instance, a comparable entity of "10.1 MP camera with 2.8 inch screen" may be given an overall similarity score or weight of 1.7 (0.9 plus 0.8) and a comparable entity of "9.9 MP camera with 3.1 inch screen" may be given an overall similarity score or weight of 1.8 (0.9 plus 0.9). In this instance, then, "9.9 MP camera with 3.1 inch screen" is a more favorable comparable match than "10.1 MP camera with 2.8 inch screen." It should be noted that the simple mathematical example illustrated herein is merely by way of example and is not intended to limit the scope of the present invention in any way. Many possible ranking algorithms are possible, as will be understood by those of ordinary skill in the art.

In embodiments, prefix support may be desirable with respect to filtering out items in the entity store 206 prior to assigning similarity scores. That is, calculating a similarity score for every item in the entity store 206 for each query may be computationally expensive. If items are filtered through the use of prefix support, significant improvements in performance may be had. Such utilization is intended to be within the scope of embodiments of the present invention.

Utilizing the components 212, 214, 216, 218, 220, 222, 224, 226, 228, and 230 the semantic suggestion generator 208 is configured to construct a trie from one or more query logs, each query being annotated with its top weighted interpretations. Then, given a partial query, the semantic suggestion generator 208 is able to locate the top weighted completion paths from the trie and transmit them for presentation as query formulation suggestions and/or related query suggestions. In instances wherein not enough suggestions are determined to qualify as "top" suggestions, for instance where a minimum threshold number of query formulation suggestions is desired, additional query formulation suggestions may be identified by the query formulation suggestion generating component 224 (even though they may not meet a minimum desired threshold weight, for instance). Any semantically duplicate suggestions may be eliminated. If a category/attribute/attribute value suggestion is the semantic prefix of one or more remaining suggestions, an attribute extension suggestion may be inserted below such category/attribute/attribute value suggestion upon presentation. In embodiments, the semantic suggestion generator 208 may render query trie suggestions with multiple interpretations as an annotated query with disambiguation information. Various presentations of query formulation suggestions, related query suggestions, and search results are described in U.S. patent application Ser. No. 13/166,969 entitled "Interactive Semantic Query Suggestion for Content Search," filed on Jun. 23, 2011, hereby incorporate by reference as if set forth in its entirety herein.

Figure 3:
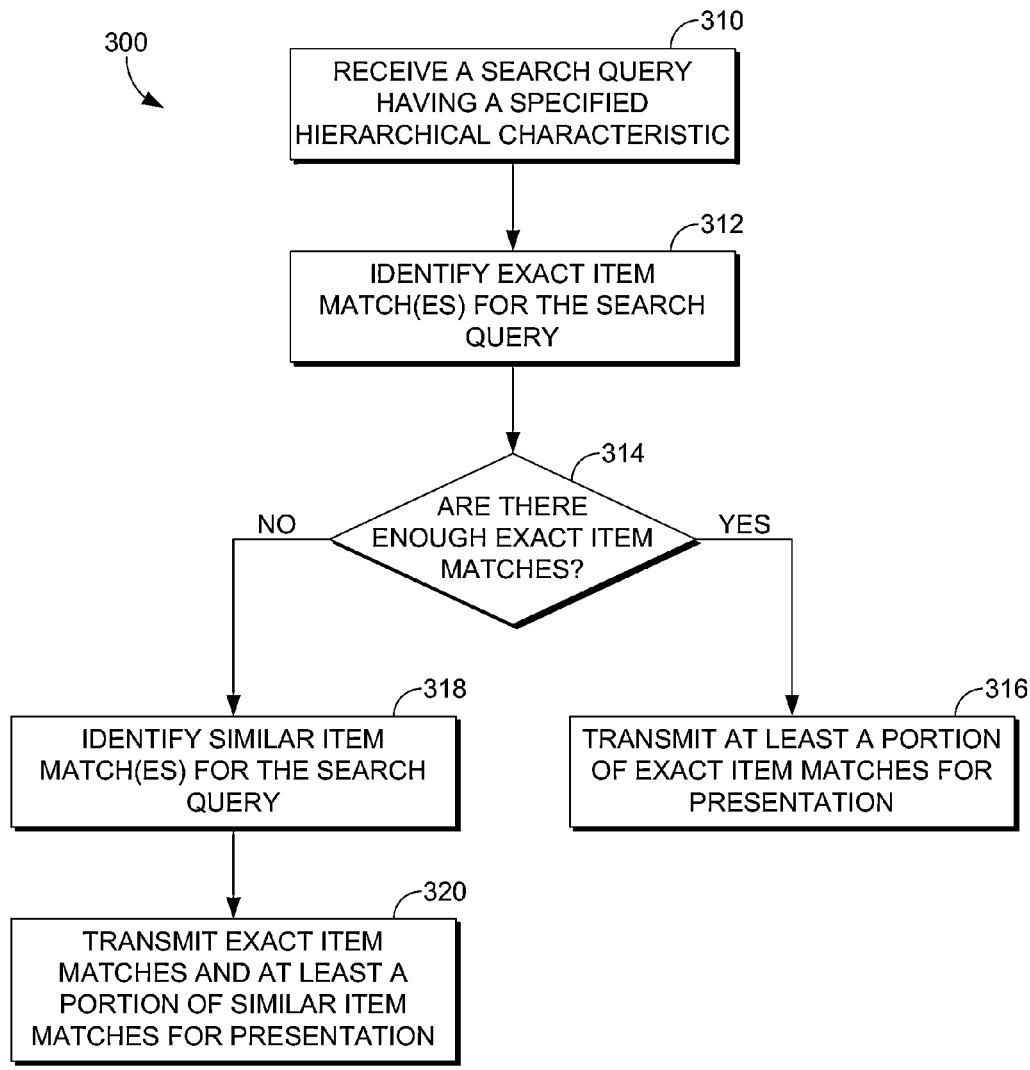
FIG. 3 is a flow diagram of an exemplary method for identifying low-match queries, in accordance with an embodiment of the present invention.

Turning now to FIG. 3, a flow diagram is illustrated showing a method 300 for identifying low-match queries, in accordance with an embodiment of the present invention. As indicated at block 310, a search query having at least one specified hierarchical characteristic is received, for instance, by receiving component 212 of the semantic suggestion generator 208 of FIG. 2. The at least one specified hierarchical characteristic may be a category, attribute, attribute value, or the like. As indicated at block 312, any exact item matches for the search query are identified. Such identification may be performed, for instance, query formulation suggestion generating component 224 of FIG. 2. It is then determined if there are enough exact item matches (for instance, if a predefined threshold number of matches is met). This may be performed, for instance, by comparable item determining component 230 of the semantic suggestion generator 208 of FIG. 2. If it is determined that enough exact item matches are available, at least a portion of such items are transmitted for presentation, e.g., utilizing transmitting component 226 of the semantic suggestion generator 208 of FIG. 2. This is indicated at block 316. If, however, it is determined that not enough exact item matches are available, comparable item matches for the search query are determined, as indicated at block 318 (for instance, utilizing comparable item determining component 230 of the semantic suggestion generator 208 of FIG. 2). Any identified exact item matches and a least a portion of the identified comparable item matches are then transmitted for presentation (e.g., by transmitting component 226 of the semantic suggestion generator 208 of FIG. 2), as indicated at block 320.

Figure 4:
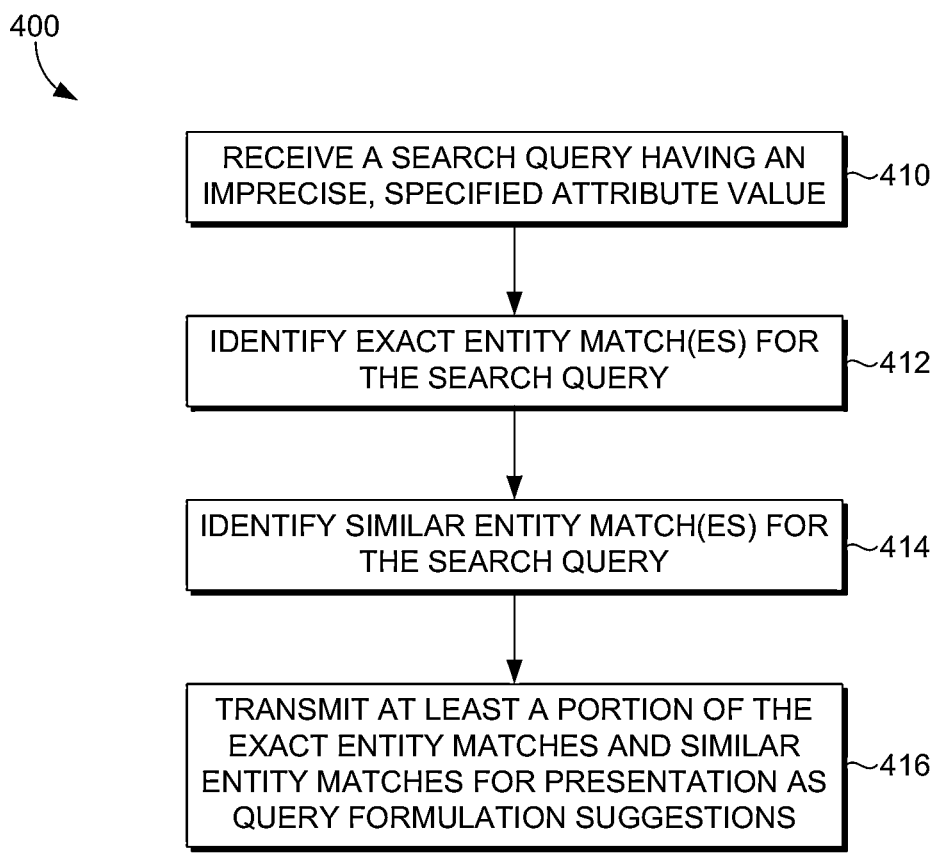
FIG. 4 is a flow diagram of another exemplary method for identifying low-match queries, in accordance with an embodiment of the present invention.

With reference to FIG. 4, a flow diagram is illustrated showing a method 400 for identifying low-match queries, in accordance with an embodiment of the present invention. As indicated at block 410, a search query is received, the search query having at least one specified attribute value. The exact entity matches for the search query are then identified, as indicated at block 412. Comparable entity matches are then identified, as indicated at block 414, and at least a portion of the exact entity matches and a portion of the comparable entity matches are transmitted for presentation, e.g., as query formulation suggestions. This is indicated at block 416.

As can be seen, embodiments of the present invention provide for systems, methods and computer-storage media having computer-usable instructions embodied thereon, for identifying low-match search queries and determining items to suggest to the user in response to an low-match query. Embodiments further relate to informing the user, by way of a presented indicator, or the like, that a presented item was selected for presentation based upon a similarity metric rather than being determined an exact match for the input query.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method performed by a computing device having a processor and a memory for identifying comparable item matches for search queries, the method comprising:

receiving at least a portion of a search query inputted on a Web page associated with a search engine;

accessing an entity data store comprising one or more entities, and one or more categories associated with the one or more entities, wherein the one or more entities are items having associated information and are associated with at least one of the one or more categories;

using the entity data store, identifying a number of exact item matches for the at least a portion of the search query;

determining that the number of exact item matches is below a predefined threshold; and upon determining that the number of exact item matches is below the predefined threshold, using the entity data store to identify comparable item matches for the at least a portion of the search query, wherein using the entity data store to identify the comparable item matches for the at least the portion of the search query comprises:

(1) assigning a similarity score to each of a plurality of non-matching entities in the entity data store that indicates a relative similarity to at least one of the exact item matches, (2) comparing the similarity score to a predefined similarity score, (3) generating query formulation suggestions using a portion of the plurality of non-matching entities that have similarity scores greater than the predefined similarity score, the portion of the plurality of non-matching entities comprising comparable item matches, and (4) presenting at least a portion of the query formulation suggestions on the Web page associated with the search engine.

2. The method of claim 1, wherein the predefined similarity score is user-specified.

3. The method of claim 1, further comprising utilizing at least a portion of the exact item matches to further generate additional query formulation suggestions, and transmitting at least a portion of the additional query formulation suggestions for presentation.

4. The method of claim 3, wherein presenting the at least the portion of the query formulation suggestions on the Web page associated with the search engine further comprises transmitting an indicator of which query formulation suggestions were generated utilizing comparable item matches.

5. The method of claim 1, further comprising utilizing at least a portion of the comparable item matches to generate related query suggestions and transmitting at least a portion of the generated related query suggestions for presentation.

6. The method of claim 1, further comprising transmitting the exact item matches and at least a portion of the comparable item matches for presentation as query results.

7. The method of claim 6, wherein transmitting the exact item matches and the at least a portion of the comparable item matches for presentation as query results further comprises transmitting an indicator of which query results are comparable item matches.

8. The method of claim 1, wherein the similarity score is based in part on a semantic similarity between the each of the plurality of non-matching entities and the at least one of the exact item matches.

9. The method of claim 1, wherein the similarity score is based in part on numeric similarity between the each of the plurality of non-matching entities and the at least one of the exact item matches.

10. The method of claim 1, wherein the similarity score is based in part on a spelling similarity between the each of the plurality of non-matching entities and the at least one of the exact item matches.

11. The method of claim 1, wherein the similarity score is based in part on a geographic similarity between the each of the plurality of non-matching entities and the at least one of the exact item matches.

12. The method of claim 1, wherein the similarity score is based in part on a temporal similarity between the each of the plurality of non-matching entities and the at least one of the exact item matches.

13. The method of claim 1, wherein the similarity score is based in part on a social similarity between the each of the plurality of non-matching entities and the at least one of the exact item matches.

14. One or more computer-storage media storing computer-useable instructions that, when used by a computing device, cause the computing device to perform a method for identifying query formulation suggestions, the method comprising:

receiving at least a portion of a search query inputted on a Web page associated with a search engine, the at least the portion of the search query having at least one specified hierarchical characteristic comprising a category or an attribute;

accessing an entity data store comprising one or more entities, and one or more categories associated with the one or more entities, and one or more attributes associated with the one or more entities, wherein the one or more entities are items having associated information and are associated with at least one of the one or more categories, or the one or more attributes;

using the entity data store, identifying a number of exact item matches for the at least a portion of the search query;

using the entity data store, identifying comparable item matches for the at least a portion of the search query, wherein using the entity data store to identify comparable item matches for the at least the portion of the search query comprises:

(1) identifying a plurality of non-matching entities in the entity data store having one or more hierarchical characteristics, (2) assigning a similarity score to each hierarchical characteristic for each of the plurality of non-matching entities that indicates a relative similarity to at least one of the exact item matches;

(3) determining an overall similarity score for each of the plurality of non-matching entities, (4) comparing the overall similarity score to a predefined similarity score, and (5) identifying as comparable item matches those non-matching entities that have an overall similarity score greater than the predefined similarity score;

utilizing at least a portion of the exact item matches and at least a portion of the comparable item matches to generate query formulation suggestions;

transmitting at least a portion of the generated query formulation suggestions for presentation; and presenting the at least the portion of the generated query formulation suggestions on the Web page associated with the search engine.

15. The one or more computer-storage media of claim 14, wherein the method further comprises receiving a user-indication that utilization of comparable item matches for generating query formulation suggestions is desired.

16. The one or more computer-storage media of claim 14, wherein the predefined similarity score is user-specified.

17. The one or more computer-storage media of claim 14, wherein presenting the at least the portion of the generated query formulation suggestions on the Web page associated with the search engine further comprises transmitting an indicator of which query formulation suggestions were generated utilizing comparable item matches.

18. The one or more computer-storage media of claim 14, wherein the similarity score is based on one or more of semantic similarity, numeric similarity, spelling similarity, geographic similarity, temporal similarity, and social similarity with respect to the at least one of the exact item matches.

19. One or more computer-storage media storing computer-useable instructions that, when used by a computing device, cause the computing device to perform a method for identifying query formulation suggestions, the method comprising:

receiving at least a portion of a search query inputted on a Web page associated with a search engine, the at least the portion of the search query having at least one entity and at least one hierarchical characteristic associated with the at least one entity, wherein an entity is an item having associated information;

accessing an entity data store comprising one or more entities, and one or more categories associated with the one or more entities, and one or more attributes associated with the one or more entities, and one or more attribute values associated with the one or more entities, wherein the one or more entities are associated with at least one of the one or more categories, or the one or more attributes, or the one or more attribute values;

using the entity data store, identifying a number of entities that exactly match (known as "exact entity matches") the at least one entity associated with the at least a portion of the search query;

determining that an insufficient number of exact entity matches are identified;

using the entity data store, identifying a plurality of non-matching entities having one or more hierarchical characteristics that have one or more of semantic similarity, numeric similarity, spelling similarity, geographic similarity, temporal similarity, and social similarity with respect to the at least the portion of the search query, the plurality of non-matching entities comprising comparable entity matches;

utilizing at least a portion of the exact entity matches and at least a portion of the comparable entity matches to generate query formulation suggestions;

transmitting at least a portion of the generated query formulation suggestions for presentation; and presenting the at least the portion of the generated query formulation suggestions on the Web page associated with the search engine.

* * * * *